United States Patent [19]

Iguchi

[11] Patent Number: 5,053,593
[45] Date of Patent: Oct. 1, 1991

[54] LOW-FREQUENCY ELECTROMAGNETIC INDUCTION HEATER

[75] Inventor: Atushi Iguchi, Kyoto, Japan

[73] Assignee: Nikko Corporation Ltd., Kyoto, Japan

[21] Appl. No.: 567,764

[22] Filed: Aug. 15, 1990

Related U.S. Application Data

[62] Division of Ser. No. 469,064, Jan. 23, 1990, Pat. No. 4,999,467.

[30] Foreign Application Priority Data

Jan. 23, 1989 [JP] Japan .................................. 1-14541
May 29, 1989 [JP] Japan .................................. 1-137081
Aug. 8, 1989 [JP] Japan .................................. 1-205137

[51] Int. Cl.$^5$ .............................................. H05B 6/12
[52] U.S. Cl. ............................ 219/10.493; 219/10.75; 219/10.67; 219/10.79
[58] Field of Search ................... 219/10.493, 10.491, 219/10.75, 10.79, 10.67, 10.71; 336/232

[56] References Cited

U.S. PATENT DOCUMENTS

| | | | |
|---|---|---|---|
| 3,378,917 | 4/1968 | Lapham | 219/10.79 |
| 3,906,181 | 9/1975 | Hibino et al. | 219/10.49 |
| 4,029,926 | 6/1977 | Austin | 219/10.493 |
| 4,095,076 | 6/1978 | Tsumori et al. | 219/10.493 |
| 4,532,398 | 7/1985 | Henriksson | 219/10.79 |
| 4,571,472 | 2/1986 | Pollack et al. | 219/10.79 |
| 4,792,652 | 12/1988 | Seguy et al. | 219/10.493 |

FOREIGN PATENT DOCUMENTS 56-86789 7/1981 Japan .
58-39525 8/1983 Japan .

*Primary Examiner*—Philip H. Leung
*Attorney, Agent, or Firm*—Fish & Richardson

[57] ABSTRACT

A low-frequency electromagnetic induction heater includes a plurality of leg iron cores, a corresponding yoke iron core arranged on the leg iron cores, an induction coil wound around each leg iron core, and an iron plate or metal vessel for producing Joule heat with which the leg iron cores or induction coils are substantially in direct contact. The spaces between the yoke iron core, the leg iron cores and the induction coils are solidly filled with a resinous substrate which has been molded using molten resin. The induction heater produces less noise than other such heaters while providing a higher level of electromagnetic flux density.

6 Claims, 5 Drawing Sheets

LOW-FREQUENCY ELECTROMAGNETIC INDUCTION HEATER

This application is a divisional of U.S. application Ser. No. 07/469,064, filed Jan. 23, 1990, now U.S. Pat. No. 4,999,467.

FIELD OF THE PRESENT INVENTION

This invention relates to a low-frequency electromagnetic induction heater which operates with a low-frequency three-phase alternating current power source, and in particular, with a three-phase alternating current power in the commercial frequency range.

BACKGROUND OF THE INVENTION

Generally, petroleum, coal and/or natural gas are burnt as heat sources for generation of steam and heating water in generating station and factories.

Fuel gases such as city gas and propane gas have been generally and widely used as heat sources for cooking.

Griddles for use in the restaurant business, such as where stakes and Japanese style tacos (Okonomiyaki) are served, commonly fuel gases a heat sources. These griddles for use in the restaurant business have thick iron cooking plates. Gas is burnt under these plates so as to heat up these plates, and materials to be cooked, such as meat,are placed on the surface of the plate and heated with the conduction heat coming through these plates.

Other methods for heating iron cooking plates are known. One method is where an iron cooking plate is heated with the use of a nichrome resistance wire heater. Another method is where an iron cooking plate is indirectly heated by an induction heat source as disclosed in Japanese Examined Patent Application No. 58-39525 and Japanese Unexamined Utility Model Application No. 56-36789.

Electrical resistance heater are preferred as a heat source in particular industrial production processes where heating by burning petroleum, coal and/or natural gas is not the preferable methods for heating. For example is the process of combining an axle with a wheel and an inner bearing race of an axle with a bearing for rolling stock or an electric car. In these cases, a round metal plate with a central round hole must be combined with an axle. This is done by heating the round metal plate with a central round hole so that the central round hole is thermally expanded. Then the axle is inserted into the central round hole, and the plate is cooled down to give a tightly combined assembly. Electric heating is the most suitable method for heating in these types of cases.

The most frequently used method of heating in the restaurant business is gas burning, as discussed above, which in the problem of management of combustion gas evolved. The combustion gas should not be exhausted towards the customers. And, in cases where the combustion gas is exhausted in a direction other than toward the customers, for example, beneath or to the side of the cooking plate, the efficiency of heating is considerably decreased. Therefore, the combustion gas is currently exhausted towards the cook. When fuel gas is used, an exhaust duct must be provided, and this is constructed above the cook's head. Therefore, the cook has to breathe in the combution gas and oily smoke, and is exposed to high temperature and high humidity, leading to a terrible working environment.

A further problem in heating by gas burning is that the oily smoke dirties walls and ceilings.

Another problem in heating by gas burning is that there exists the dangerous possibility of a gas-explosion or an oxygen deficiency. Therefore, at places such as an underground market or a high building, the use of gas burning is often restricted for safety reasons.

A further problem in heating by gas burning is that the cooking plate suffers an irreversible deformation due to strain inside the plate caused by thermal stress.

Also, heating with a nichrome resistance wire heater presents a serious problem in that the cooking plate is destructively deformed by the large strain caused by the thermal stress due to the local heating and the increased electrical capacity. Therefore, the method of electrical heating with a nichrome resistance wire heater presents difficulties.

Additionally, in known methods of indirect heating with an induction heat source there exists a critical and unavoidable prblem. Electromagnetic vibration of the plate occurs, resulting in loud noises, and sometimes destruction of the cooking apparatus itself.

SUMMARY OF THE INVENTION

It is the primary object of this invention to provide a low-frequency electromagnetic induction heater which operates stably and safely due to inhibition of electromagnetic vibration by continuously attracting a heating the element to be heated, such as an iron cooking plate or a metal vessel, to induction coils at all times during operation, which object is realized by the following embodiments:

(1) employment of three-phase alternating current power source, and, (2) employment of a specific electric connection between induction coils.

It is the another object of this invention to provide a low-frequency electromagnetic induction heater with high thermal efficiency and easy temperature control, which is effective for prevention of an over-heating, and consequently, prevention of formation of burnt material on a food material such as meat.

It is yet another object of this invention to provide a low-frequency electromagnetic induction heater wherin the heating element is conveniently attached and detached, and yet still operates in a steady and safe manner.

It is yet another object of this invention to provide a low-frequency electromagnetic induction heater which can operate without magnetically attracting iron cooking tools, such as nives, spatulas and trowels, by which a noisy sound may be generated due to vibration of these tools on a heating element, and without giving an undesirable magnetic effect to a precision instrument such as a wrist watch, by preventing an escape of a magnetic flux from a heating element to the above and outside of the heating element.

In order to accomplish the above objects, this invention includes a low-frequency electromagnetic induction heater which operates with continuous attraction of the heating element to the induction coils, wherein each coil has a circular configuration, the coils are positioned in a circular and symmetrical configuration, and the coils form three sets of coils such that each set of coils receives electrical power in a different phase from a three-phase electrical power source, and wherein the coils are interconnected such that the current flows from a first coil to a second coil substantially opposed to the first coil.

It is preferable in this invention that the number of induction coils is six and that they are electrically connected in a three-phase double delta (delta delta) connection.

It is preferable in this invention that the frequency of the three-phase electric power is the commercial frequency.

It is preferable in this invention that the induction coils are sustained and protected in a resinous mold.

It is preferable in this invention that the heating element is an iron plate or a metal vessel.

It is preferable in this invention that the center of the heating element of an iron plate or a metal vessel substantially coincides with the center of the magnetic flux.

It is a preferable in this invention that the low-frequency electromagnetic induction heater is used as an iron cooking plate for cooking meat.

It is preferable in this invention that the low-frequency electromagnetic induction heater is used as a steam generator.

BRIEF DESCRIPTION OF THE DRAWINGS

This invention will now be described in detail with reference to the following drawings.

DETAILED DESCRIPTION OF THE INVENTION

A special feature of the low-frequency electromagnetic induction heater of this invention is that it comprises at least six induction coils, wherein each coil has a circular configulation, the coils are positioned in a circular and symmetrical configuration, and wherein the coils form three sets of coils such that each set of coils receives electrical power in a different phase from a three-phase electrical power source, and wherein the coils are interconnected such that the current flows from a first coil to a second coil substantially opposed to the first coil. The employment of this specific electric connection among induction coils achieves:

(1) heating of heating element with continuous attraction to induction coils at all times during operation,
(2) an enormous increase of electromagnetic flux density,
(3) prevention of noisy sound due to electromagnetic vibration of the heating element, and,
(4) high thermal efficiency.

The low-frequency electromagnetic induction heater of this invention provides a very convenient heater having easy temperature control, prevention of formation of burnt material on cooked materials such as meat, and prevention of generation and scattering of oily smoke. Because an iron plate itself is the heat source in the case when an iron plate is used as a heatingelement, the usual large temperature difference between the heat source and the heating element is avoided in this invention.

Any heating element can be used in this invention, if the heating element has a shape capable of contacting the plane of the induction coils and is made of a material which can permeate magnetic flux, such as metallic material. In the case where the induction coils have flat tops, any heating element having a flat portion capable of contacting with the induction coils can be used in this invention. In this case, the heating element can be simply placed on the flat tops of the induction coils during use and removed after use, if such attachment and detachment is desired or nessesary.

Figure 1:
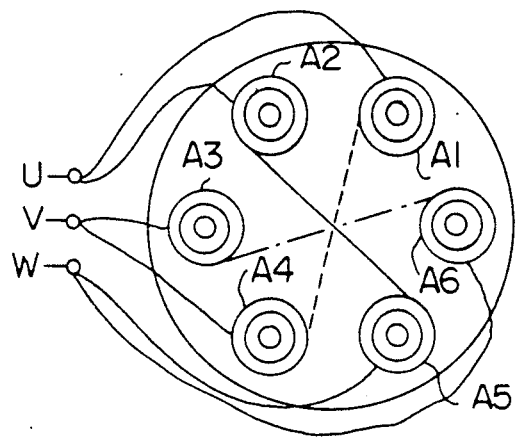
FIG. 1 shows a typical connection diagram of a three-phase double delta connection in a preferred embodiment of this invention.

FIG. 1 shows a typical connection diagram of a three-phase double delta connection which is the most important part of this invention. Six induction coils numbered from A1 to A6 are placed in a substantially circular configuration. The neighboring two coils A1 and A2 have been connected with the U phase of three-phase electric power, and the next neighboring two coils A3 and A4 have been connected with the V phase of three-phase electric power, and in the same manner, the last neighboring two coils A5 and A6 have been connected with the W phase of three-phase electric power. Then, each coil is connected to another the substantially opposed coil in the circular and symmetrical configuration of the coils, so that the current flows from one coil to the opposing coil.

Namely, the coils A1 and A4, the coils A2 and A5, and the coils A3 and A6, respectively, are connected to each other. With this specific electric connection among coils, a continuous due to an electromagnetic force is generated between the induction coils and the heating element, for example an iron plate, and thus, they are continuously attracting each other. Therefore, even when a low-frequency alternating current electrical power source is employed, the heater does not produce noise due to electromagnetic vibration.

Figure 8A:
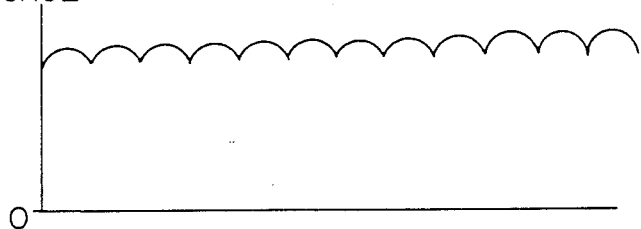
FIG. 8(A) shows the relationship between the electromagnetic attractive force generated in the heater of this invention and time.
Figure 8B:
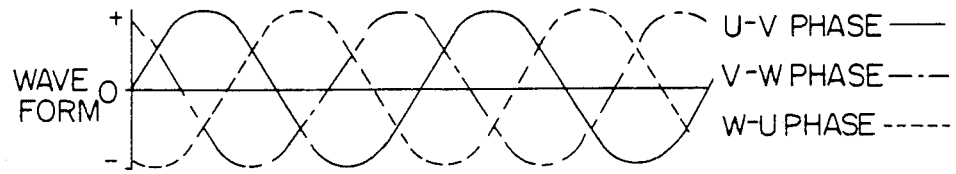
FIG. 8(B) shows the relationship between the current wave form of three-phase alternating current and time using the same time scale as FIG. 8(A).

Point 0 in the FIG. 8 (A) indicates where no attractive forces is generated. FIG. 8 (B) shows current waveform of the three-phase alternating current. The figure shows the time courses of each current wave-form of phases U, V, and W. The relationship between FIG. 8 (A) and FIG. (B) will be explained in detail. The waveform of attractive force in FIG. 8 (A) has been drawn on the same time scale as that of FIG. 8 (B) showing a current wave-form of the three-phase alternating current. The attractive force generated in this heater by the specific electric connection among induction coils is the result of synthesis of the attractive forces generated by each current phases, namely, both the waves in the minus part and that in the plus part generate the attractive forces.

Induction coils of either right-handed or left-handed rotation direction may be employed in this invention, since an alternating current power source is utilized. It is, however, pointed out that it is necessary for all the induction coils to have the same direction of rotation.

Figure 6:
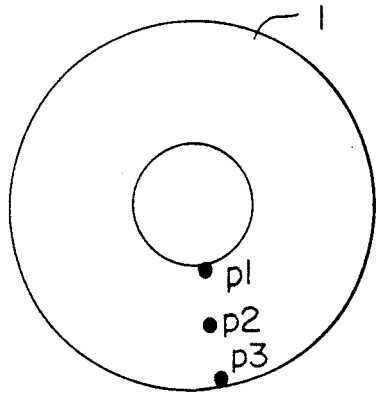
FIG. 6 shows a plot of measuring points of Example 2 of this invention.
Figure 2:
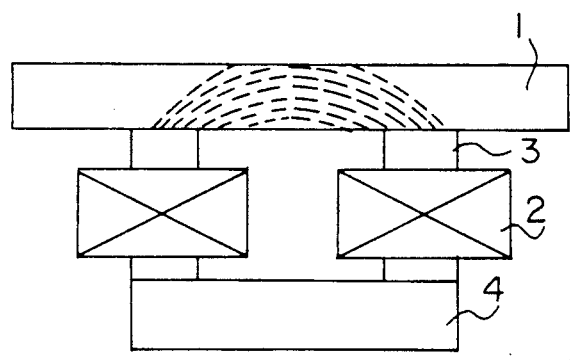
FIG. 2 shows a principal operation of this invention.

FIG. 2 shows a principle mode of operation of this invention. The induction coil formed around the leg iron core 3 is positioned on the yoke iron 4. The figure depicts the case where an iron plate for an inner bearing race is used as a heating element. The lines of magnetic flux pass through the iron plate 1, and the eddy current is generated around these lines. The eddy current thus generated heats up the iron plate 1 from the central portion from the inside (FIG. 6). Even in the case where the iron plate has a hole in its central portion, the iron plate is heated from the periphery of the hole, because the magnetic flux passes through the metal periphery of the hole. More explanation about FIG. 6 will be presented in the Example.

Figure 3:
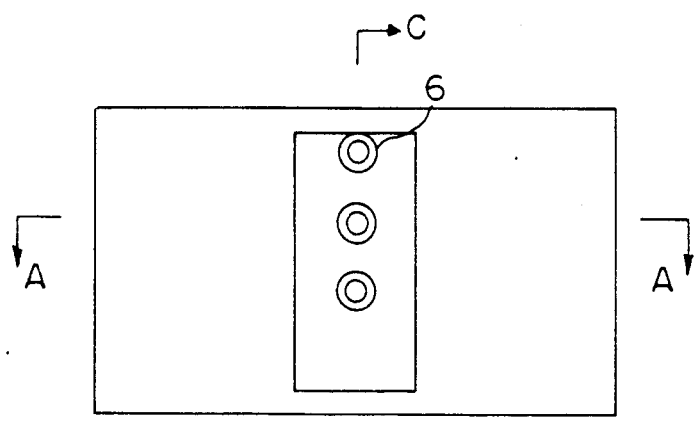
FIG. 3 shows a side view of a heater in this invention from the direction of the terminal 6.

FIG. 3 shows a side view of a heater in this invention from the direction of the terminal 6.

Figure 4:
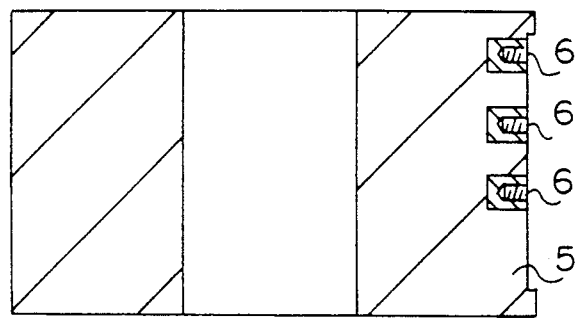
FIG. 4 shows a cross sectional view alongline C—C of the heater shown in FIG. 3.

A cross sectional view along line C—C of the heater is shown in FIG. 4. Three of the terminals 6 are provided so that the coils can receive electrical power from the three-phase electrical power source, as previously explained. The material denoted with reference numeral 5 is a resinous molding compound which surrounds the induction heating elements.

Figure 5:
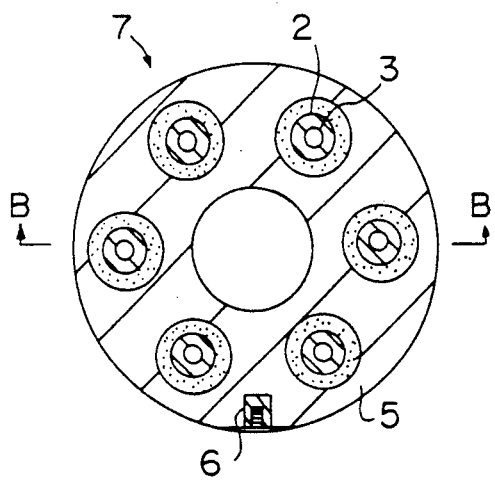
FIG. 5 shows a cross sectional view along line A—A of the heater shown in FIG. 3.

FIG. 5 shows a cross sectional view along line A—A of the heater shown in FIG. 3. The induction coil formed around the leg iron core 3 is positioned on the yoke iron 4. The whole assembly is placed in a mold, then the mold is filled with molten resin to form a resinous mold having the coils and the irons inside. The reason why such resinous molding is performed is to protect the user from electrical shock and to maintain sight of the heater. Preferable molding resins are those having high thermal resistivities, for examples, epoxy resins and silicone resins.

Figure 7:
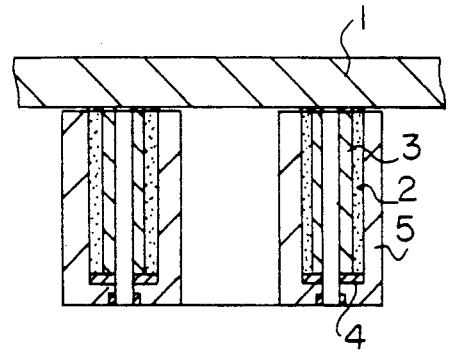
FIG. 7 shows a cross sectional view along line B—B of the heater shown in FIG. 5.

FIG. 7 shows a cross sectional view along line B—B of the heater shown in FIG. 5. The heating element is an iron cooking plate 1 for cooking beef steak, for example.

In the case where 25 A of an alternating current flows through the primary induction coils by supplying 200 V of a commercial frequency three-phase alternating power source at 50 or 60 Hz, the current of 0.5 V and 10,000 A flows through the secondary iron plate according to the voltage transformation principle. The low voltage and high current combination are the most important factor in heating. This invention satisfactorily puts the principle into practice. Because the voltage of the current passing through the iron plate1 is so low, a user never receives an electrical shock even if he touches the plate.

It is preferable in this invention that the low-frequency electromagnetic induction heater comprises at least six induction coils electrically connected in a three-phase double delta connection. As shown in FIG. 8, in this connection the continuous attractive force is realized in the best manner.

The iron plate 1, when employed as a heating element, may have any thickness as long as a magnetic flux can permeant through the plate. For example, the thickness ranges from 1 to 10 cm, but it is not restricted to this range. At least six of the induction coils 2 formed around the leg iron core 3 are placed under the iron plate 1. Although the number of the induction coils may be any number larger than six, for example, nine or twelve, six is preferable from the view point of achieving an easy electrical connection. The circular configuration of the six induction coils is preferable. However the configuration is not restricted to the above. Any configuration which allows the magnetic flux to pass through the iron plate 1 can be employed.

The heating element is placed closely to the induction coils 2 so that the magnetic flux can easily pass through the plate. A heat-resistant films such as polyimide film or polyaromatic-amide film may be inserted as a buffer material between the iron plate 1 and the iron core 3, unless the film inhibits the permeation of the magnetic flux through the plate. The material of the iron core 3 or the yoke iron may be any material if it permits permits permeation of the magnetic flux. One preferable concrete example is a yoke iron of a coiled silicon steel plate. The thickness of the iron core or the iron yoke is such that the thickness maintains prevention of magnetic saturation. Preferably, the area of the cross section is sufficiently large so as to maintain a density of the magnetic flux below 20,000 gauss.

The three-phase alternating current power source is preferably one of the commercial frequency. The commercial frequency current source is widely available and, therefore, economically most preferable. Here, the commercial frequency may be different from country to country. For example, in Japan, it is of 50 Hz or 60 Hz. The reason why the three-phase alternating current source is used is so that the attractive force between the induction coils and the iron plate can be continuously generated and maintained.

Figure 11:
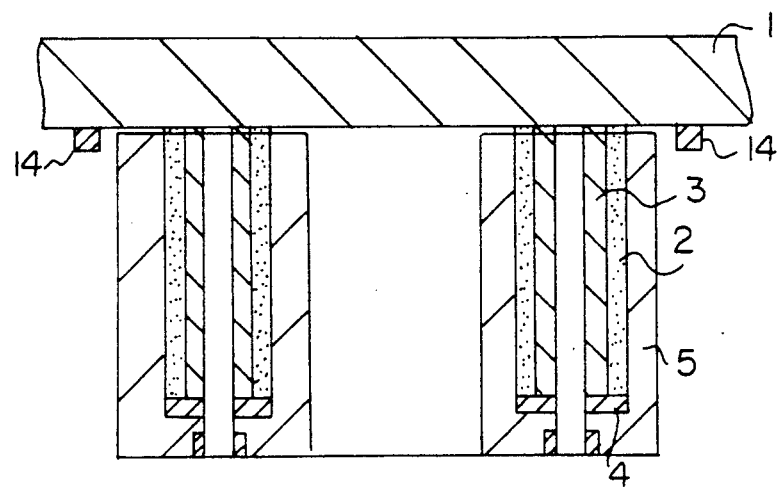
FIG. 11 and FIG. 12 shows an another embodiment in this invention, which is equiped with a good magnetic conductor as an escaping magnetic flux catcher.
Figure 12:
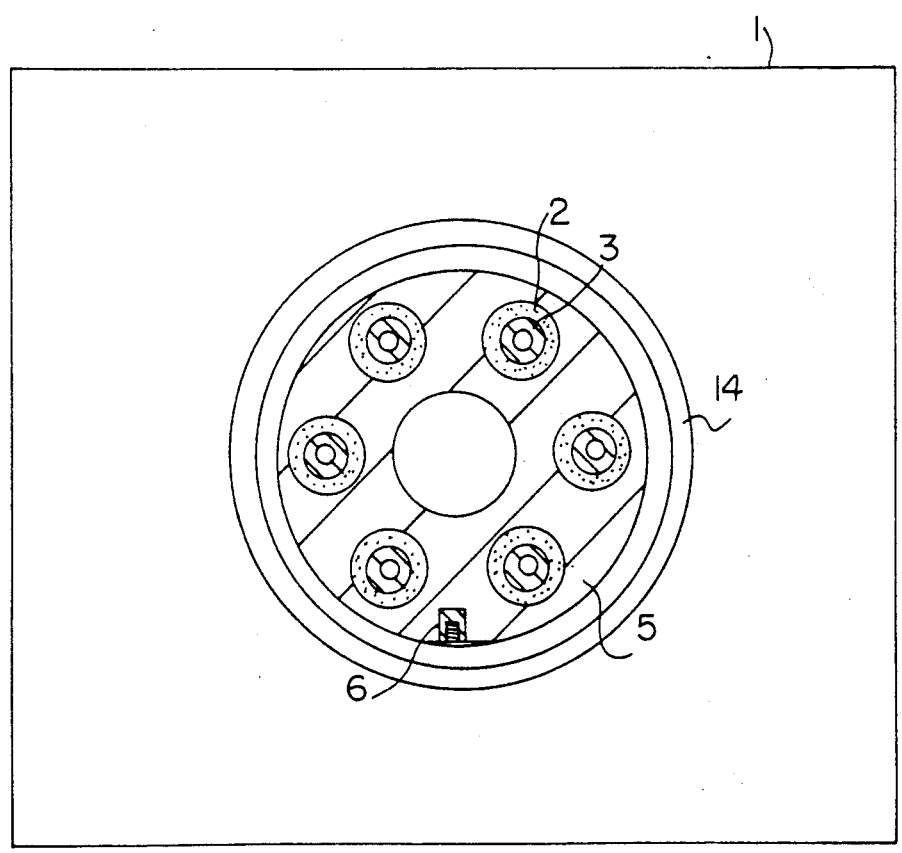

Next, in the case where prevention of an escape of a magnetic flux from a heating element 1 to the above and outside of the heating element 1 is nessessary, a good magnetic conductor 14, which absorbingly catches an escaping magnetic flux, is attached around a conjunction of ion cores 3 and a heating element 1, as shown in FIG. 11 and FIG. 12. In the embodiment shown in FIG. 11 and FIG. 12, the good magnetic conductor 14 is fixed with bolts to the heating element 1, however, the method of fixation is not restricted to the above. A preferable good magnetic conductor 14 is one that has a ring like outer shape and is made by piling up silicon steel plates. The size of the good magnetic conductor is restricted to such sizes with these the thermal efficiency of the heating element 1 is not drastically decreased. The excessively large good magnetic conductor 14 decreases the thermal efficiency of the apparatus by reducing the density of the effective magnetic flux inside the heating element 1. For an example, a preferable good magnetic conductor 14 is one that has a ring like outer shape of 400 mm in diameter, which is made by piling up silicon steel plates of 20 mm width and 15 mm thickness.

In the above configuration of the apparatus, the magnetic flux is generated inside the iron cores 3, which, individually, are rounded by the induction coils 2, and passes through the heating element 1 wherein Joule heat is evolved, and finally flow to reach the opposing iron cores 3. Here, it should be noted that the iron cores 3 is made of a good magnetic conducting material, and that the heating element 1 is made of a less magnetic conducting material than that used in the iron cores 3. Therefore, an escape of the magnetic flux from the heating element 1 occurs in some extent. Hence, the present inventor put a good magnetic conductor, which absorbingly catches an escaping magnetic flux, on the conjunction of ion cores 3 and the heating element 1.

The temperature of the heating element can be easily controlled by controlling the electrical current. Because the electrical current in ampere units and the temperature of the heating element has a simple and constant relation, the temperature of an iron cooking plate or a metal vessel is easily controlled to a suitable temperature for individual cooking conditions. For example, in the case of cooking a beef steak, the temperature of the iron cooking plate is automatically controllable in the range from 180° to 200° C. with the accuracy of ±1° C. Thus, cooking by intuition or perception is not necessary, and a veteran cook is not required. The merit of this heater comes from employing iron cooking plate or a metal vessel itself as the heating element. This aspect is completely different in priciple from the prior art in which the temperature difference between the heat source and the heating element always exists. Because formation of burnt material or a generation of an oily smoke can be prevented with an extremely high probability, a duct may be unnecessary. Clean cooking provides an excellent working environment. The present three-phase alternating current induction heater dose not make noise, and is useful as a very quiet cooking apparatus. In addition, even after usage for a long period of time, the present three-phase alternating current induction heater does not suffer deformation of the iron plate.

Any optional elements, such as a temperature indicator, an overheat inhibitor, and a limit switch can be attached to the present three-phase alternating current induction heater.

Examples of effective applications of the present three-phase alternating current induction heater are a cooking plate for cooking meat such as a beef steak, as described above, a boiler, a steamer, a pan, a pot, a low-range for cooking french dishes, an inner bearing race machine for vehicles, and a heater for any other metal materials.

In this invention, a low-frequency electromagnetic induction heater with a stable and safe operation due to prevention of an electromagnetic vibration by continuous attraction of a heating element, such as an iron cooking plate and a metal vessel, to induction coils at all times during operation has been realized because of the following embodiments:

(1) employment of three phase alternating current power source, and,
(2) employment of a specific electric connection among induction coils.

The low-frequency electromagnetic induction heater of this invention can provide the following numerous merits:

(1) Construction of a duct may be unnecessary, because formation of burnt material or generation of oily smoke is prevented with an extremely high probability;
(2) An excellent working environment can be provided by a clean cooking;
(3) A very quiet cooking apparatus is provided because of elimination of noisy sound; and in addition,
(4) The present three-phase alternating current induction heater is free from the disadvantage of demerit of the iron plate after usage for a long period of time, because the iron cooking plate of the metal vessel itself is the heating element, and because the iron plate of the vessel is not necessarily heated to such a high temperature that may cause overheating.

Further, in this invention, a good magnetic conductor, which absorbs an escaping magnetic flux, is attached around iron cores and on a heating element of a low-frequency electromagnetic induction heater, which realizes;

(1) prevention of an escape of a magnetic flux from a heating element to the above and outside of the heating element, consequently,
(2) prevention of a noisy sound generation due to vibration of iron cooking tools, such as nives, spatulas and trowels, on a heating element, or of giving an undesirable magnetic effect to a precision instrument such as a wrist watch.

This invention will now be illustrated with reference to the following examples that by no means limit the scope of the invention.

EXAMPLE 1

An iron cooking plate having 50 mm thickness, 50 cm length and 100 cm width is placed on induction coils as shown in FIGS. 1 to 5 and 7, an electromagnetic induction griddle is constructed. The dimensions of the whole resinous molding part 7 including the induction coils, shown in a ground plan FIG. 5 are, about 270 mm in outer diameter and about 100 mm in inner diameter for the central hole. Each of the six induction coils is about 45 mm in diameter, and each of the central holes inside the induction coils has a diameter of about 15 mm. The height of the whole assembly shown in a front view FIG. 7, is about 160 mm. The resin used for molding is an epoxy heat-resistant resin.

The three-phase alternating current power of 60 Hz, 200 V, and 25 A is supplied to the induction coils to provide a current flow. It can be estimated from the electric power supplied to the primary induction coils that the current inside the iron cooking plate is of 0.5 V and 10,000 A. The temperature of the iron cooking plate of this apparatus could be raised to 200° C. during in 15 minutes. After that, a beefsteak was put on the iron plate whose temperature was controlled at 200° C., a constant temperature. The beef steak was finely roasted without the formation of burnt material or generation of oily smoke. It was recognized that this cooking apparatus does not sound noisy and thus is quiet.

EXAMPLE 2

Figure 9:
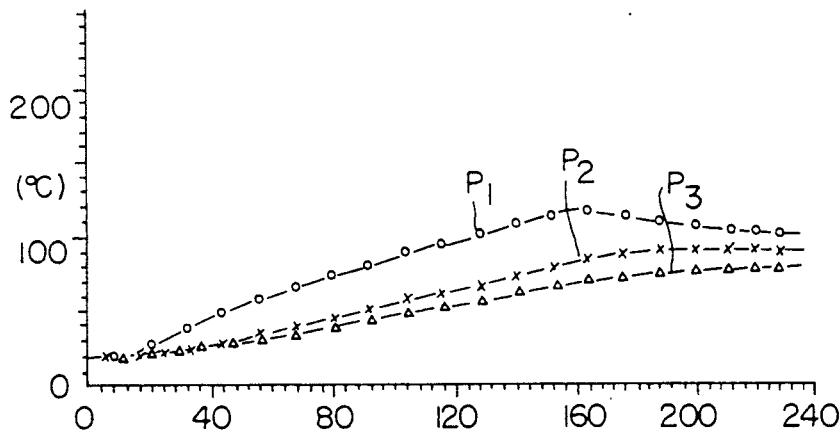
FIG. 9 shows a temperature-rise curve of Example 2 of this invention.

A inner bearing race for vehicles shown in FIG. 6, having an other diameter of 290 mm, an inner diameter of 130 mm and a thickness of 35 mm, and made of iron, was placed on the induction coils instead of the iron plate 1 in the FIG. 7. The temperature of the inner bearing race was raised from 25° C. to 100° C. By supplying a three-phase alternating current power of 200 V and 14 A to the apparatus, the temperature at the periphery of the central hole P1 was raised to 100° C. after 160 seconds as shown in FIG. 9. After 160 seconds the temperature curve became flat, which was caused by the action of the thermistor, by cutting the electrical connection to the electrical power source. The temperature at the middle part, P2, and at the periphery of the outer side of the inner-race, P3, reach 100° C. after about 200 seconds. The reason why the temperature at the periphery of the central hole, P1, is higher than the temperature at the middle part, P2, or at the periphery of the outer side of the inner-race, P3, is considered to be due to the density of the magnetic flux being higher in the central part than in the other parts. The thermal expansion coefficient for iron is $\alpha = 1.2 \times 10^{-5} K^{-1}$.

Thus, the temperature difference of 75° C. makes the iron expansion of 0.117 mm. Consequently, an axle could be inserted into the thermally expanded race to yield a tightly combined assembly.

In the case where the above operation is performed by induction heating with a transformer as in the prior art, the opration takes more than 30 minutes. Therefore, it can be seen that this heating apparatus could perform the same job as the transformer in the prior art, in only about one tenth of the time required by the transformer.

EXAMPLE 3

Figure 10:
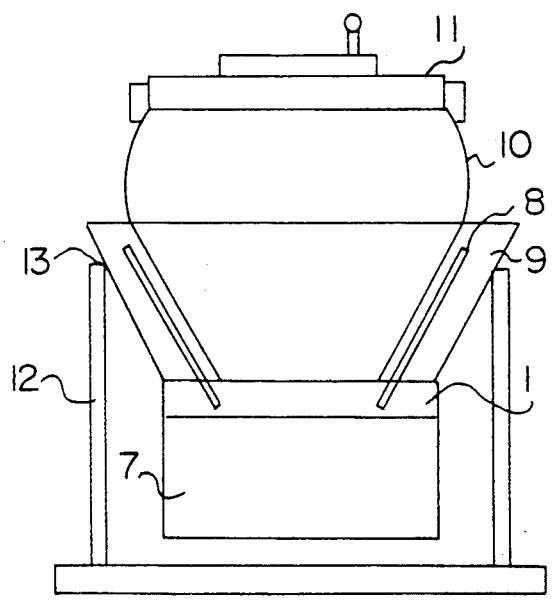
FIG. 10 shows a rice-cooker, one of the preferred embodiments in this invention.

FIG. 10 shows an example of a rice-cooker according to this invention. The rice-cooker comprises a pot 10 wherein the rice is boiled in the upper part, and a resinous molding part 7 including induction coils and a heating element 1 (an iron plate) in the lower part. The pot 10 has heat-pipes 8 at the inside of its side-wall part 9. In this example, the linear heat-pipes were set up with a standing configuration. Commercially avairable heat-pipes may be employed. The heat-pipes have the effect of enlarging the heating surface area so that the rice-cooker can provide heat from the side-wall.

The rice-cooker described is a type of a pressure cooker, so that it has a lid 11. The rice-cooker has props 12 and fulcrums 13 so that the cooked rice can be easily remove from the pot by rotating the pot. The structure of the resinous molding part 7 is shown in FIGS. 1 to 5 and 7. The entire iron plate 1 serves as a heating plate, and therefore the heating surface is very large. Because of the large heating surface, the temperature of the heating element can be set up within 30° C. higher than the cooking temperature of 100° to 110° C. without burning the materials inside.

The principle described in this example may be applied to a low-range or other heating device.

EXAMPLE 4

In this example, the effect of a good magnetic conductor on decreasing a density of an escaping magnetic flux will be explained by the data obtained in the measurement with the use of Gauss counter.

An iron cooking plate having 50 mm thickness, 50 cm length and 100 cm width is placed on induction coils as shown in FIGS. 1 to 5, 11 and 12, an electromagnetic induction griddle is constructed. The three-phase alternating current power of 60 Hz, 200 V, and 25 A is supplied to the induction coils to allow current flow. It can be estimated from the electric power supplied to the primary induction coils that the current inside the iron cooking plate is of 0.5 V and 10,000 A. The temperature of the iron cooking plate of this apparatus could be raised to 185° C. during 15 minutes. After that, a beef steak was roasted on the iron plate at constant temperature of 185° C. The beef steak was finely roasted without a formation of a burnt or a generation of an oily smoke. It has been recognized that this cooking apparatus does not sound, thus, is quiet.

In the case where a silicon steel ring of 400 mm in diameter, made by piling up silicon steel plates of 20 mm width and 15 mm thickness, is used as a good magnetic conductor 14, and where the three-phase alternating current power of 60 Hz, 200 V, and 25 A is supplied to the induction coils to heat up the iron cooking plate 1, the density of the escaping magnetic flux has been measured to be in the range from 3 to 5 gauss by the use of Gauss counter.

Contrary to the above, in the case where a good magnetic conductor 14 is not in use, the density of the escaping magnetic flux has been measured to be in the range from 180 to 200 gauss by the use of Gauss counter.

I claim:

1. A low-frequency electromagnetic induction heater, comprising a plurality of leg iron cores, a corresponding yoke iron core arranged on the leg iron cores, an induction coil wound around each leg iron core, and an iron plate or metal vessel for producing Joule heat with which the leg iron cores or induction coils are in direct contact, wherein spaces between the yoke iron core, the leg iron cores and the induction coils are solidly filled with a resinous substrate which has been molded with molten resin.

2. A low-frequency electromagnetic induction heater as set forth in claim 1, wherein the resin is a heat resistant resin.

3. A low-frequency electromagnetic induction heater as set forth in claim 1, wherein the resin is either epoxy resin or silicone resin.

4. A low-frequency electromagnetic induction heater as set forth in claim 1, wherein the yoke iron core and the leg iron cores are made of silicon steel plates and have a density of magnetic flux below 20,000 Gauss.

5. A low-frequency electromagnetic induction heater as set forth in claim 1, wherein the iron plate or the metal vessel has a thickness of 1 to 10 cm at a portion at which the iron plate or the metal vessel rests on the leg iron cores.

6. A low-frequency electromagnetic induction heater as set forth in claim 1, wherein a thermocontroller is provided to maintain the iron plate or the metal vessel at a predetermined temperature.

* * * * *